US012186263B2

(12) United States Patent
Zeutzius et al.

(10) Patent No.: US 12,186,263 B2
(45) Date of Patent: Jan. 7, 2025

(54) PORTABLE, REUSABLE, AND DISPOSABLE INTERMITTENT PNEUMATIC COMPRESSION SYSTEM

(71) Applicant: Impact IP, LLC, Rocklin, CA (US)

(72) Inventors: Turner Lucas Zeutzius, Horseshoe Bay, TX (US); Adrian Slattery, Rocky River, OH (US); Douglas Halley, Westlake, OH (US)

(73) Assignee: Impact IP, LLC, Rocklin, CA (US)

( * ) Notice: Subject to any disclaimer, the term of this patent is extended or adjusted under 35 U.S.C. 154(b) by 662 days.

(21) Appl. No.: 17/354,277

(22) Filed: Jun. 22, 2021

(65) Prior Publication Data

US 2022/0142851 A1 May 12, 2022

Related U.S. Application Data

(63) Continuation of application No. 16/550,819, filed on Aug. 26, 2019, now Pat. No. 11,052,015, which is a (Continued)

(51) Int. Cl.
*A61H 9/00* (2006.01)
*A61H 1/00* (2006.01)

(52) U.S. Cl.
CPC ............. *A61H 9/0078* (2013.01); *A61H 1/00* (2013.01); *A61H 9/0092* (2013.01); (Continued)

(58) Field of Classification Search
CPC ...... A61H 9/00; A61H 9/0078; A61H 9/0092; A61H 9/005; A61H 2290/00; A62F 5/012; A62F 5/034; A62F 5/5816; A62F 15/004

(Continued)

(56) References Cited

U.S. PATENT DOCUMENTS 3,859,989 A 1/1975 Speilberg
4,320,746 A 3/1982 Arkans
(Continued)

OTHER PUBLICATIONS

Notice of Allowance dated Apr. 30, 2021 for U.S. Appl. No. 16/550,819.

(Continued)

*Primary Examiner* — Justine R Yu
*Assistant Examiner* — Douglas Y Sul
(74) *Attorney, Agent, or Firm* — Dorsey & Whitney LLP

(57) ABSTRACT

The present invention discloses a deep vein thrombosis ("DVT") device that is portable, tubeless, and battery-operated, which ensures that the patient will have maximum mobility during recovery. The DVT device provides a pneumatically controlled bladder portion, which is actuated by an electronically controlled air pump, where the pump/bladder combination is enclosed in a "pocket" of a wrap or cuff during use. All pump, battery, and control components are protectively housed in a plastic case that is permanently attached to the bladder portion. Once the pump/bladder combination is placed in the "pocket" the wrap or cuff will be sealed. The wraps or cuffs are single use, disposable garments designed to provide an absorbent barrier during use, where the bladder portion and air pump remain clean during use and can be reused by the patient or hospital staff. Tabs or extensions may be used to secure the pump/bladder combination after insertion into the "pocket" of the wrap or cuff.

7 Claims, 15 Drawing Sheets

Related U.S. Application Data continuation of application No. 15/800,541, filed on Nov. 1, 2017, now Pat. No. 10,434,033.

(52) U.S. Cl.
CPC ................ *A61H 2201/0103* (2013.01); *A61H 2201/0157* (2013.01); *A61H 2201/1238* (2013.01); *A61H 2201/164* (2013.01); *A61H 2201/1642* (2013.01); *A61H 2201/1645* (2013.01); *A61H 2201/1688* (2013.01); *A61H 2201/169* (2013.01); *A61H 2201/50* (2013.01); *A61H 2201/5025* (2013.01); *A61H 2201/5043* (2013.01); *A61H 2201/5056* (2013.01); *A61H 2201/5071* (2013.01); *A61H 2205/10* (2013.01); *A61H 2205/106* (2013.01); *A61H 2209/00* (2013.01)

(58) Field of Classification Search
USPC ........................................................ 602/3, 13
See application file for complete search history.

(56) References Cited

U.S. PATENT DOCUMENTS 4,374,518 A 2/1983 Villanueva
4,402,312 A 9/1983 Villari
4,453,538 A 6/1984 Whitney
4,597,384 A 7/1986 Whitney
5,031,604 A 7/1991 Dye
5,307,791 A 5/1994 Senoue
5,437,610 A 8/1995 Cariapa
5,478,119 A 12/1995 Dye
5,496,262 A 3/1996 Johnson, Jr.
5,588,955 A 12/1996 Johnson, Jr.
5,626,556 A 5/1997 Tobler
5,672,148 A 9/1997 Maunmier
5,795,312 A 8/1998 Dye
5,876,359 A 3/1999 Bock
6,030,353 A 2/2000 Van Brunt
6,231,532 B1 5/2001 Watson
6,315,745 B1 11/2001 Kloecker
6,336,907 B1 1/2002 Dono
6,537,235 B1 * 3/2003 Connor ............. A61H 23/0263 601/70
7,044,924 B1 5/2006 Roth
7,329,232 B2 2/2008 Lipshaw
7,354,410 B2 4/2008 Perry
8,079,970 B2 12/2011 Meyer
8,177,734 B2 5/2012 Vess
8,257,289 B2 9/2012 Vess
8,403,870 B2 3/2013 Vess
8,449,483 B2 5/2013 Eddy
8,535,253 B2 9/2013 Vess
9,192,539 B2 11/2015 Parish et al.
9,433,532 B2 9/2016 Vess
10,058,475 B2 8/2018 Zeutizus et al.
10,149,796 B1 12/2018 Souney et al.
10,166,166 B1 1/2019 Theroit et al.
10,434,033 B2 10/2019 Zeutzsius et al.
2001/0000262 A1 4/2001 Mcewen
2002/0042583 A1 4/2002 Barak
2003/0078674 A1 4/2003 Phillips
2003/0181990 A1 9/2003 Phillips
2004/0039317 A1 * 2/2004 Souney ................ A61H 9/0078 602/13
2004/0237203 A1 12/2004 Romano
2005/0070828 A1 3/2005 Hampson
2005/0143797 A1 6/2005 Parish
2005/0154336 A1 7/2005 Kloecker
2005/0187500 A1 8/2005 Perry
2005/0256556 A1 * 11/2005 Schirrmacher ........... A61F 7/02 607/104
2006/0236464 A1 10/2006 Beck
2006/0258964 A1 * 11/2006 Biondo ................ A61H 9/0078 601/150
2007/0049853 A1 3/2007 Adams
2007/0213650 A1 * 9/2007 Raley ................... A61H 9/0078 604/4.01
2007/0249977 A1 * 10/2007 Bonnefin ............. A61H 9/0078 602/13
2008/0058911 A1 3/2008 Parish
2008/0132976 A1 6/2008 Kane
2008/0195012 A1 * 8/2008 Miros ....................... A61F 7/02 607/114
2008/0262399 A1 10/2008 Kovelman
2009/0177184 A1 7/2009 Christensen
2009/0299239 A1 12/2009 Meyer
2010/0042026 A1 2/2010 Kloecker
2010/0081974 A1 4/2010 Vess
2010/0081977 A1 4/2010 Vess
2010/0100017 A1 4/2010 Maguina
2010/0137764 A1 6/2010 Eddy
2011/0082401 A1 4/2011 Iker
2011/0131839 A1 6/2011 Ballin
2011/0172579 A1 7/2011 Chiu
2011/0201981 A1 8/2011 Deshpande
2011/0224589 A1 9/2011 Bock
2011/0288458 A1 11/2011 Jones
2012/0065561 A1 3/2012 Ballas
2012/0078145 A1 3/2012 Malhi
2012/0078146 A1 3/2012 Deshpande
2012/0089063 A1 * 4/2012 Olson .................. A61H 9/0078 601/152
2012/0209153 A1 8/2012 Farrow et al.
2013/0012847 A1 1/2013 Lowe
2013/0245508 A1 9/2013 Maxon-Maldonado
2013/0253383 A1 * 9/2013 Maxon-Maldonado ..................... A61H 9/0078 601/15
2013/0345519 A1 9/2013 Edelman
2013/0310719 A1 11/2013 Davis
2013/0338552 A1 12/2013 Malhi
2014/0094726 A1 4/2014 Malhi
2014/0222121 A1 8/2014 Spence
2014/0276254 A1 * 9/2014 Varga ................... A61H 9/0007 601/15
2014/0303533 A1 10/2014 Zeutzius
2016/0074656 A1 3/2016 Helfer et al.
2016/0361224 A1 12/2016 Ramakrishna et al.
2019/0008717 A1 1/2019 Moore

OTHER PUBLICATIONS

Notice of Allowance dated Aug. 7, 2019 for U.S. Appl. No. 15/800,541.
Office Action dated Feb. 8, 2018 for U.S. Appl. No. 15/800,541.
Office Action dated Jun. 13, 2019 for U.S. Appl. No. 15/800,541.
Office Action dated Sep. 6, 2018 for U.S. Appl. No. 15/800,541.

* cited by examiner

PORTABLE, REUSABLE, AND DISPOSABLE INTERMITTENT PNEUMATIC COMPRESSION SYSTEM

CROSS-REFERENCE TO RELATED APPLICATIONS

This application is a continuation of U.S. application Ser. No. 16/550,819, titled PORTABLE, REUSABLE, AND DISPOSABLE INTERMITTENT PNEUMATIC COMPRESSION SYSTEM, filed on Aug. 26, 2019, which is a continuation of U.S. application Ser. No. 15/800,541, titled PORTABLE, REUSABLE, AND DISPOSABLE INTERMITTENT PNEUMATIC COMPRESSION SYSTEM, filed on Nov. 1, 2017, both of which are hereby incorporated by reference in their entireties.

TECHNICAL FIELD

This invention relates to an intermittent pneumatic compression system, and more particularly, to a portable intermittent pneumatic compression system with a reusable air pump and bladder and a disposable wrap for holding the air pump and bladder.

BACKGROUND OF THE INVENTION

A major concern for immobile patients and like persons are medical conditions that form clots in the blood, such as, deep vein thrombosis (DVT) and peripheral edema. These conditions associated with patient immobility may be controlled or alleviated by applying intermittent pressure to a patient's limb, such as, a leg to assist in blood circulation. Such compression devices are typically constructed of two sheets of material secured together at the seams to define one or more fluid impervious bladders, which are connected by tubes to a source of pressure for applying sequential pressure around a patient's body parts for improving blood return to the heart. Conventional DVT devices focus on two methods for providing compression therapy—(1) a separate pump connected by tubes to a combination wrap/bladder and (2) an integrated pump/bladder/wrap.

Shortcomings of the devices that require tubing are numerous. Typically, such devices present a tripping hazard and are inconvenient to use and manage. Additionally, such devices typically lack true portability. Conventional pumping systems are usually dependent upon an AC power source and too bulky to provide a patient meaningful opportunity to travel while using the system Furthermore, conventional devices cause discomfort to a patient by preventing or severely limiting circulation to the patient's wrapped limb. As a result, patients often complain of sweat, soreness, and general discomfort of the limb. Moreover, conventional systems obtain pressure readings at the inlet port, which does not necessarily provide an accurate measure of pressure at the most remote parts of the bladder. Thus, the requisite pressures may not be achieved at such remote parts of the bladder during pumping. Several solutions to these problems are disclosed in related Patent Publication No. 2014/0303533, which is titled "Portable Intermittent Pneumatic Compression System" This related application is hereby incorporated by reference.

Reusability is another shortcoming of current DVT devices. In a hospital or clinic setting, numerous patients must reuse the same DVT devices, but the wrap or cuff needs to be reprocessed before it can be used again. Because reprocessing is a significant cost to hospitals, a less expensive disposable option is needed. Disposal wraps or cuffs would eliminate the need for cleaning and reprocessing. The other option is to continuously buy new wraps or cuffs at a high cost to the healthcare provider, and a cost-effective cuff or wrap would alleviate those concerns.

Currently, a DVT wrap manufacturer's business model is to provide the compression pump to the medical institution at no charge and the manufacturer receives compensation by requiring the medical institution to purchase a given number of wraps per pump. Conventional wraps include an air bladder combined with features to provide for donning and attachment, which allow the patient to wear the compression wrap for therapy. This pump consignment business model is used because it allows a healthcare provider to have compression pumps without entering into a capital purchase process. This current business model benefits the wrap/bladder manufacturer because it guarantees sales, but has risk because they are responsible for pump maintenance. Healthcare providers are supposed to purchase new wraps, but they have found ways to use cleaning services to reuse wraps at a significantly lower cost, which upsets the business model.

The present invention was designed to overcome one or more of these portability, reusability, and disposability problems with the current DVT devices.

BRIEF SUMMARY OF THE INVENTION

The present invention is a new approach to compression therapy and is intended to be a cost saving model, where the total cost for single use wraps combined with multi-use pumps and bladders is below the operating costs for the current pump consignment method. The present invention is designed to be used by a patient in the home or a healthcare facility to prevent DVT by stimulating blood flow in the extremities (stimulating muscle contractions). Specifically, this DVT device (1) aids in the prevention of DVT, (2) enhances blood circulation, (3) diminishes pain and swelling, (4) reduces wound healing time, (5) aids in the treatment of stasis, venous stasis ulcers, arterial and diabetic leg ulcers, chronic venous insufficiency, and reduction of edema in the lower limbs, and (6) acts as a prophylaxis for DVT by persons expecting to be stationary for long periods of time.

The present invention provides a DVT device that is portable, tubeless, and battery-operated, which ensures that the patient will have maximum mobility during recovery. In some embodiments, the system provides pneumatically controlled bladder portion that is attached to and actuated by an electronically controlled air pump, wherein the pump/bladder combination is enclosed in a "pocket" of a wrap or cuff. All pump, battery, and control components are protectively housed in a plastic case that is permanently attached to the bladder portion. There is also a port for connecting the battery charger/AC adapter plug and a USB port for use in data reporting. The micro-controller may include or be coupled to nonvolatile RAM for data storage. Such data may include time stamped usage logs and corresponding sensed pressure data.

In some embodiments, single patient use wraps or cuffs containing no bladder are supplied to the user and will act as a "pocket" for the bladder portion and air pump. Once the bladder portion and air pump are placed in the "pocket" the wrap or cuff will be permanently sealed. The wraps or cuffs are single use, disposable garments designed to provide an absorbent barrier during use and incorporate a pressure sensitive adhesion, which is skin friendly and repositionable once upon removal. The bladder portion and air pump remain clean during use and can be reused by the patient or hospital staff. Tabs or extensions may be used to secure the bladder portion and/or air pump after insertion into the "pocket" of the wrap or cuff. Additional tabs or extensions may be used on opposite sides of the wrap to secure the wrap to an appendage (arm, leg, etc.).

In some embodiments, the bladder portion may consist of two chambers that may be filled with air and are connected to the air pump. A first channel enables the air pump to deliver air to the bottom of said chambers, while a second channel at the top of said chambers, enables the air pump to measure the pressure in said chambers. The two chambers are designed to fit around the user's calf to horizontally compress the calf muscle during inflation of the bladder portion. The chambers of the bladder portion also fill from the bottom through the first channel to create distal to proximal compression of the leg, which further benefits the user.

In other embodiments, the bladder portion may be combined with the wrap or cuff, wherein this bladder/wrap combination is the single use, disposable garment. More specifically, the bladder portion includes the additional features of the wrap, so that it can be attached to a user's appendage. The reusable air pump may then be removably attached to the bladder/wrap combination. A connection mechanism would connect the air pump to the bladder/wrap combination, such that the air pump can provide air to the bladder/wrap combination through a first channel and measure the pressure of the chambers of the bladder/wrap combination through a second channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
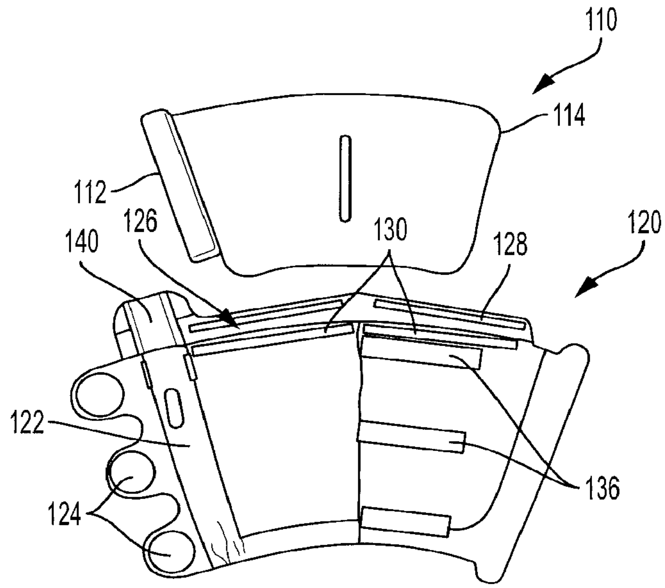
FIGS. 1A, 1B, and 1C show a portable intermittent compression system according to embodiments of the invention.
Figure 1B:
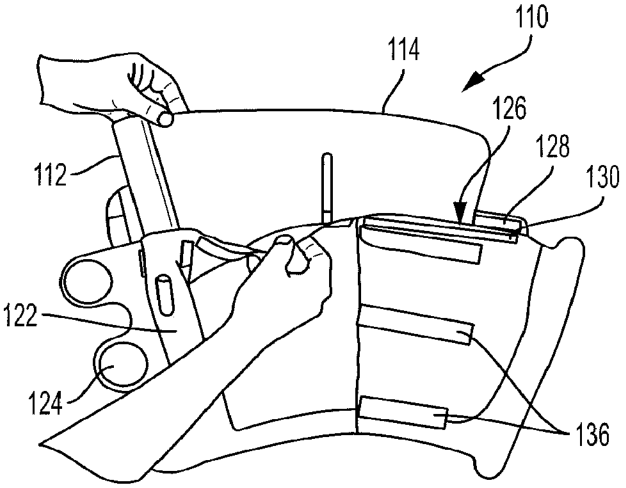
Figure 1C:
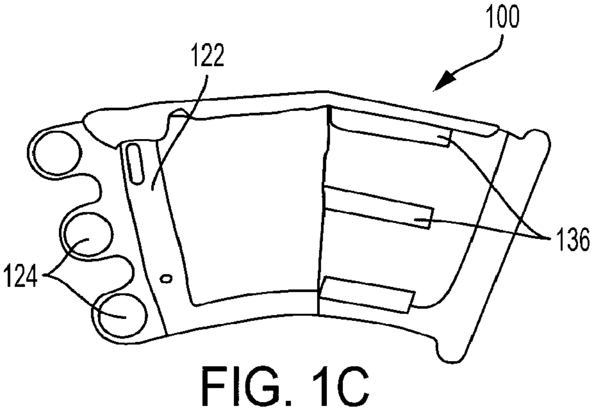

FIGS. 1A-1C show a portable, reusable, and disposable intermittent compression system 100 according to the present invention. There are two primary components of the present invention—an air pump with a bladder 110 and a wrap 120 with a pocket. The air pump and bladder 110 are configured to be placed in the pocket of the wrap 120, as shown in FIGS. 1A-1C. In FIG. 1A, the air pump and bladder 110 are shown separated from the wrap 120. FIG. 1B shows the air pump and bladder 110 being put inside a pocket 126 of the wrap 120, and FIG. 1C shows the air pump and bladder 110 fully inside the pocket 126 of the wrap 120.

The air pump with bladder 110 comprises an air pump controller 112 that is connected to a bladder portion 114. The bladder portion 114 contains one or more bladders that are filled with air or liquid by the air pump controller 112. These components will be further described below. The wrap 120 comprises a pump pocket 122 for holding the air pump controller 112, and a bladder pocket 126 for holding the bladder portion 114. As shown in FIG. 1B, the air pump with bladder 110 fits into the corresponding portions of the pump pocket 122 and bladder pocket 126. A first tab or extension

140 is used to secure the air pump controller 112 and a second tab(s) or extension(s) 128 is used to secure the bladder portion 114. The first and second tabs or extensions 140, 128 may use a hook and fastener system, or other adhesive to secure the air pump with bladder 110 after it has been inserted. FIG. 1C shows the air pump with bladder 110 fully inserted in the wrap 120. Complementary adhesive strips 130 connect to the second tabs or extensions 128 to secure the bladder portion 114. Wrap tabs or extensions 124 are used by the user to secure the wrap 120 to an appendage (arm, leg, etc.). In this embodiment, there are three circular wrap extensions 124 that are configured to connect to complementary adhesive strips 136 within the wrap 110. Thus, the wrap extensions 124 connect to the adhesive strips 136 to secure the air pump with bladder 110 and wrap 120 to an appendage of the user. The wrap extensions 124 and adhesive strips 136 may also be a hook and fastener system.

Figure 2C:
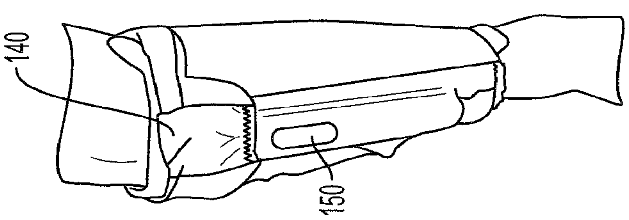
FIGS. 2A, 2B, and 2C show a portable intermittent compression system being attached to a user according to embodiments of the invention.
Figure 2B:
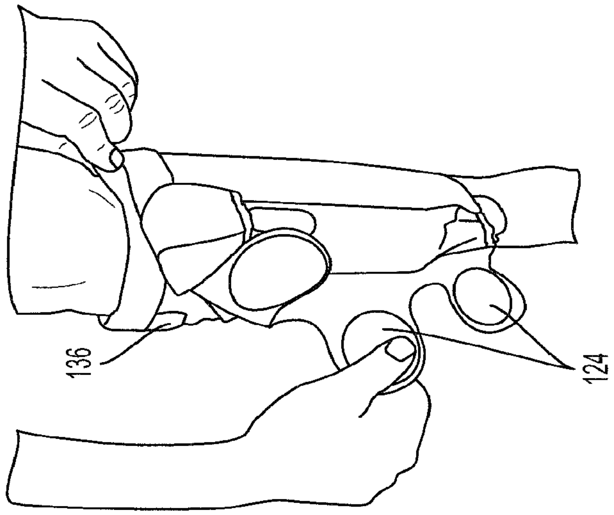
Figure 2A:
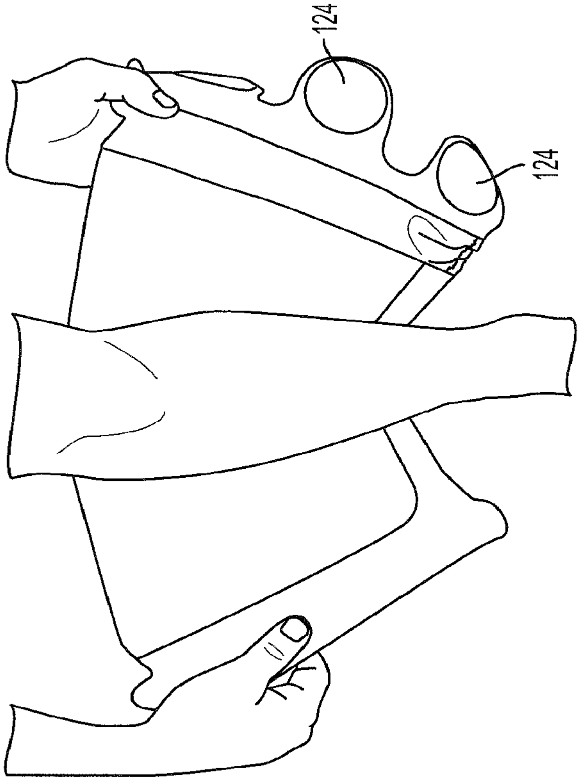

FIGS. 2A, 2B, and 2C show a portable intermittent compression system 100 being attached to a user according to embodiments of the invention. After the air pump with bladder 110 is inserted in the wrap 120 and secured, then the user may attach the system 100 to an appendage. In FIGS. 2A-2C, the wrap extensions 124 are connected to the adhesive strips 136 on the wrap 120 by the user to secure the system 110. As shown in FIG. 2C, the profile of the wrap 120 matches the user's appendage and no portions of the wrap are protruding. However, the air pump controller 112 is visible through a small window 150 on the wrap 120. The user may be able to view power status or readings from the air pump controller 112 through this window 150. The air pump controller 112 is the only component that protrudes from the user's appendage and its protrusion is minimal. Tab 140 holds the air pump controller 112 in place. Importantly, no wires, tubes, or bulky straps protrude from the wrap 120, which improves the mobility of the patient.

In some embodiments, the compression system of the present invention will inflate the bladder portion 114 from a distal location to a proximal location to a preset pressure of 50 mmHg, although other preset pressures are within the scope of this disclosure. Once the inflation reaches the preset pressure, the bladder portion 114 will deflate. Cycles of inflation and deflation will repeat approximately once a minute until the unit is turned off. For use on the leg of a user, the bladder portion 114 provides compression therapy to the sides of the calf distal and flowing proximal (traditional therapy is applied to the calf posterior starting in the distal and flowing proximal). This manner of horizontal compression will be further described herein.

The bladder portion 114 may contain reticulated foam or webbing to maintain proper air flow passageways. The airflow passageways are designed to provide simultaneous pressure to both sides of the user's appendage. The shape of the bladder portions 114 may be designed to mimic the calf muscle and optimally minimize the therapy area, which minimizes the amount of air required to fill the bladder portion 114 and provides for a shorter fill time to reach 50 mmHg. These features may improve efficacy and reduce wear and tear on the system.

Figure 3:
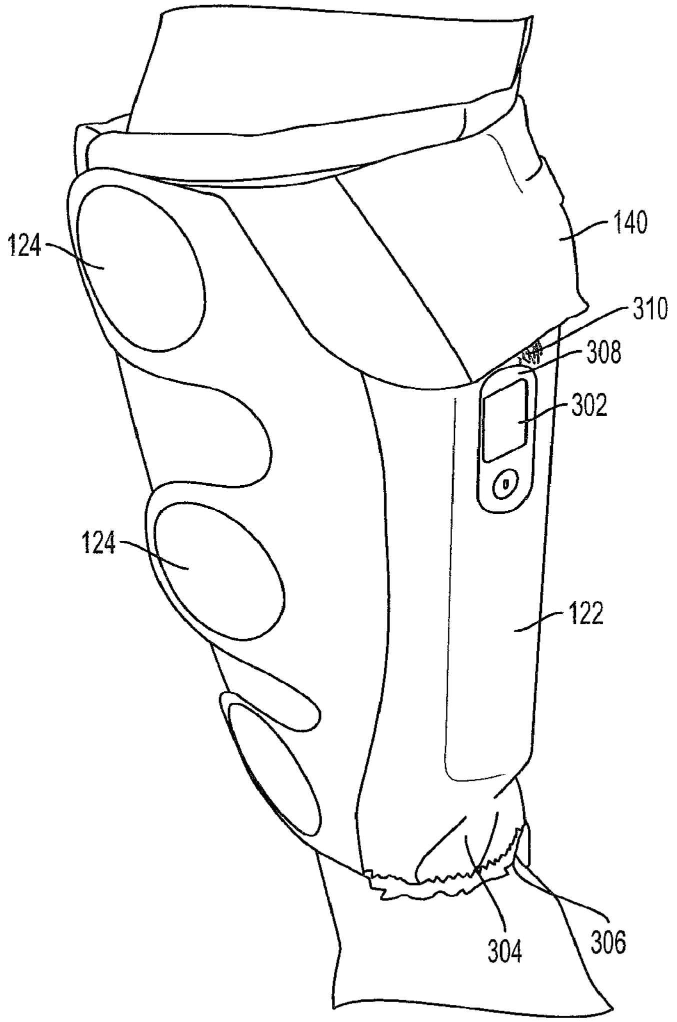
FIG. 3 shows the portable intermittent compression system attached to a user.

FIG. 3 shows an alternative embodiment of a portable intermittent compression system 100 attached to a user. In this figure, the air pump with bladder 110 is already secured inside the wrap 120. The wrap extensions 124 are connected to the adhesive strips (not shown in this figure) to fit comfortably around the user's leg. The first tab or extension 140 holds the air pump controller 112 (not shown) inside the wrap 120. The pump pocket 122 has a hole or gap 308 for displaying a window or screen 302 of the air pump controller 112. This window or screen 302 may display an on/off button, a battery life indicator, a pressure reading, or any other status indications that may be helpful to the user. FIG. 3 also shows an elastic strip 306 at the bottom of the wrap 120 for securing the wrap 120 to the user's leg or other appendage. Similar to the elastic strip 306 at the bottom of the wrap 120, there is an elastic strip 310 designed to flexibly hold the air pump controller 112 in the pump pocket 122. There is also a hole 304 at the bottom side of the pump pocket 122 for a charger plug. Here a user may use a charger cord to connect to a plug or other power source to charge the battery of the air pump controller 112. In some embodiments, the air pump controller 112 may be powered by internal rechargeable batteries, or for longer use, the user may plug a supplied power adapter into an outlet, and connecting the adapter to the air pump controller 112. The hole 304 may also provide access for a USB connector for use in data reporting. The air pump controller 112 may include or be coupled to nonvolatile RAM for data storage, such as time stamped usage logs and corresponding sensed pressure data.

The air pump with bladder 110 may be self-contained and run off a rechargeable lithium ion battery. In some embodiments, there is an accessory battery which is removeably attached to the air pump controller 112, which allows the user to experience compression therapy without being anchored to a power supply for long periods of time.

Figure 4:
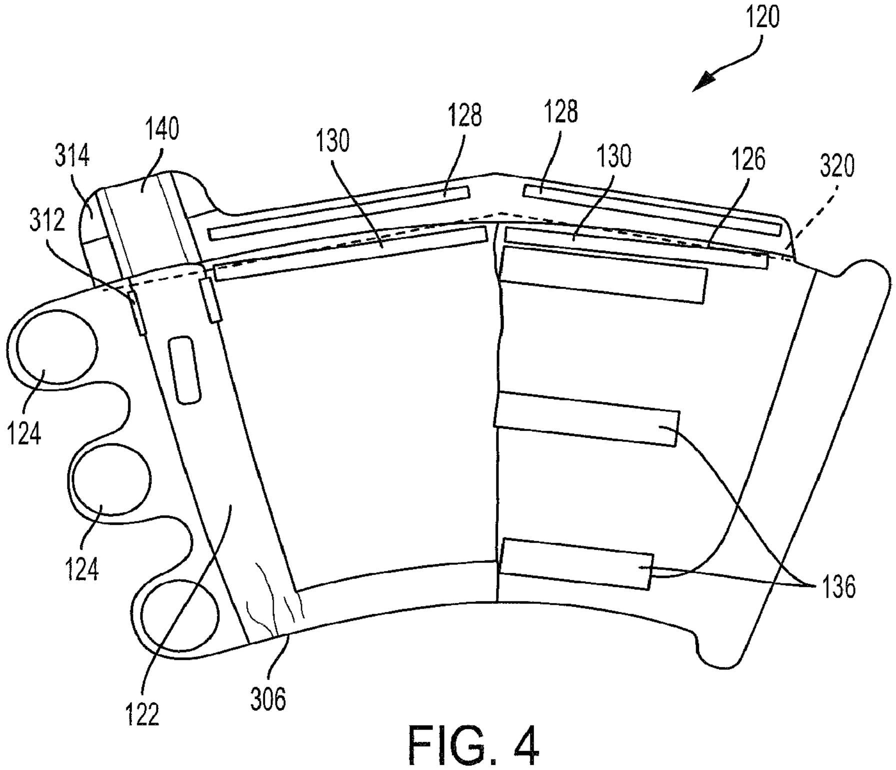
FIG. 4 shows a wrap of the portable intermittent compression system according to embodiments of the invention.

FIG. 4 shows an alternative view of the wrap 120 for the portable intermittent compression system 100. The wrap tabs or extensions 124 are designed to adhere to the complementary adhesive strips 136 on the wrap 120. Similarly, the tabs or extensions 128 are designed to adhere to the complementary adhesive strips 130 on the wrap 120 to secure the air pump with bladder 110 in the bladder pocket 126. Hook and fastener strips, peel and stick adhesive, or other adhesive may be used to secure the air pump with bladder 110. In this embodiment, peel and stick adhesive is used for the complementary tabs 128 and strips 130. There are also adhesive strips 314 on the first tab or extension 140 designed to adhere to complementary adhesive strips 312 on the pump pocket 122 to secure the air pump controller 112 in the pump pocket 122. The elastic strip 306 assists with securing the wrap 120 to a user's leg. Further, a dotted line represents a tear away seam 320 for removing the air pump and bladder 110 from the wrap 120. Specifically, the user will tear away the tabs or extensions 128, 140 by pulling on the dotted line 320 after finished with the system 100 or to replace the wrap 120.

The single-use wrap of the present invention prevents the spread of disease by not transferring germs or viruses from the wrap from patient to patient via a multi-use wrap. The wrap material may be hydrophobic to prevent disease, germs, or viruses from passing through the wrap and on to the bladder which is transferrable from patient to patient. The shape and size of the wrap should be designed to totally encompass the bladder.

Figure 5:
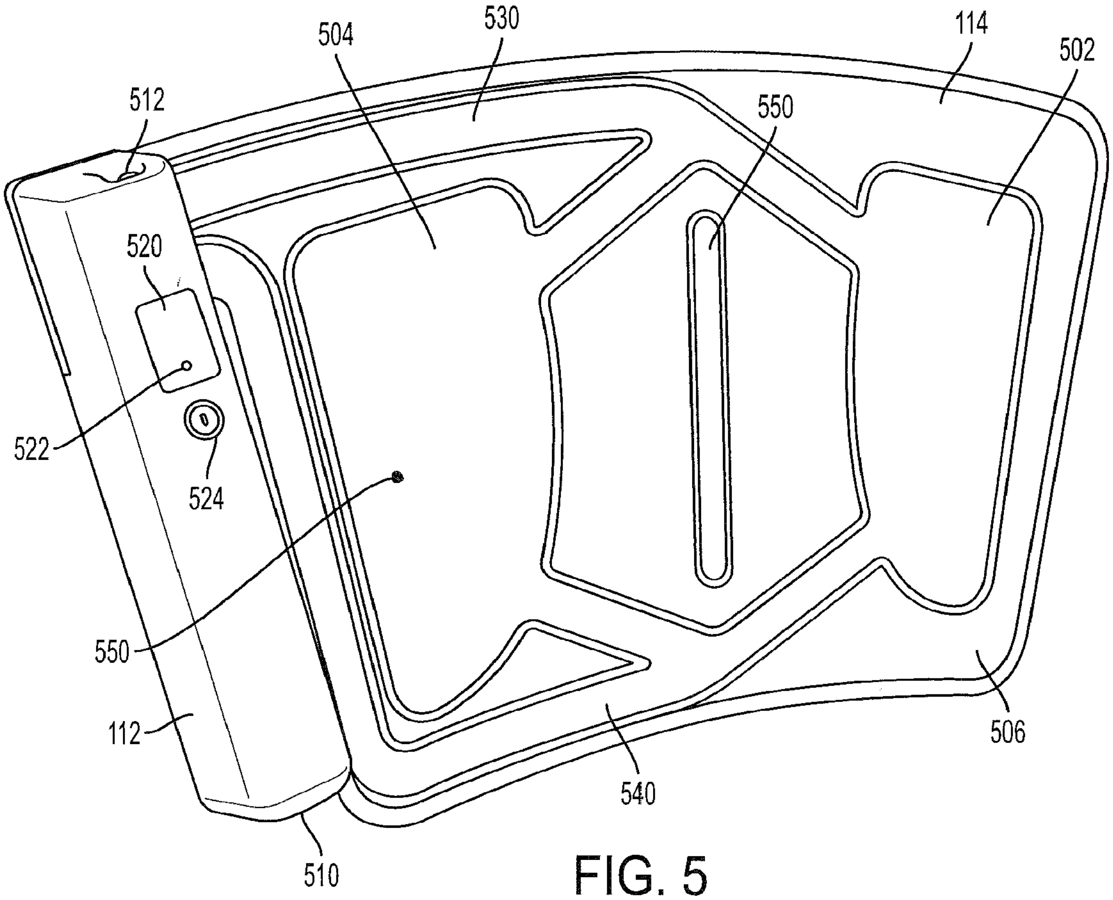
FIG. 5 shows an air pump and a bladder assembly of the portable intermittent compression system according to embodiments of the invention.

FIG. 5 shows an alternative view of the air pump and bladder 110 for the portable intermittent compression system 100. The bladder portion contains two air cells 502, 504, one for each side of the user's leg. As will be further discussed below, the air pump controller 112 includes an air pump for inflating the air cells 502, 504 for the desired amount of time and to the desired air pressure. The air or fluid enters the air cells 502, 504 through a first passageway 540, which is connected to a first valve within the air pump controller 112. The air or fluid may also exit air cells 502, 504 through the first passageway 540. The air cells 502, 504 may be manufactured out of nylon impregnated urethane. There may be a central slot 550 in the bladder portion 114, which facilitates the bladder to bend around the convex calf shape of a user. A second passageway 530 is connected to a second valve within the air pump controller 112, which is used to measure the air pressure within the air cells 502, 504. This process will be further described below. A hole or aperture 550 in one of the air cells 504 may be included as a safety feature. For example, if the air pump controller 112 stops functioning correctly and continues to fill the air cells 502, 504 beyond a safe pressure, air can be released through this hole or aperture 550 to relieve the pressure. In some embodiments, multiple holes or apertures may be used.

The air pump with bladder 110 may be set or programmed to provide compression for a specific duration. In some embodiments, the air pump controller 112 may progressively fill the bladder portion 114. Due to the configuration of the bladder portion 114, the filling and compression starts from the bottom to the top. When the desired pressure is attained (e.g., 50 mmHg), inflation may cease for a certain period of time, so that the pressure is temporarily held (e.g., 2-10 seconds). Then the air pump controller 112 deflates the bladder portion 114 for a period of time or until the pressure reaches a desired pressure (e.g., 10 mmHg). A flexible USB port 512 is shown in FIG. 5. This port 512 can be accessed by the user to download past readings or use information from the air pump controller 112. A display window 520 could display various readings or information to the user, while an LED indicator 522 could inform the user of the air pump controller's 112 status. For example, the LED indicator 522 could blink red during compression and blink green during deflation, while the display window 520 informs the user of the current air pressure. A power button 524 is also shown. The connection for the power adaptor can be accessed through a bottom portion 510 of the air pump controller 112.

Figure 6A:
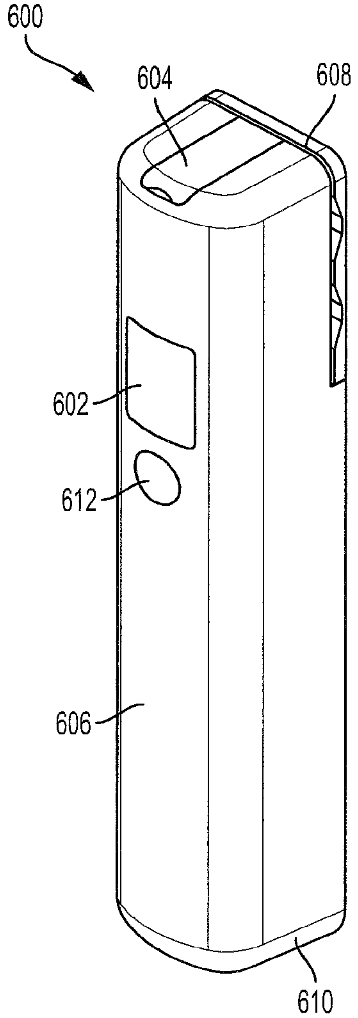
FIGS. 6A, 6B, and 6C show alternative views of the air pump controller of the portable intermittent compression system according to embodiments of the invention.
Figure 6B:
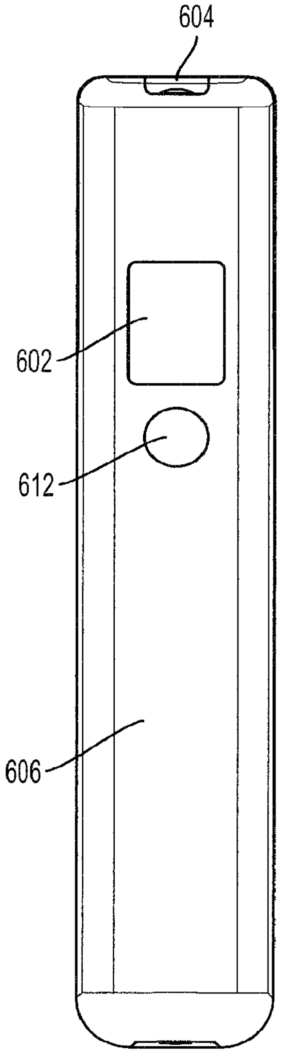
Figure 6C:
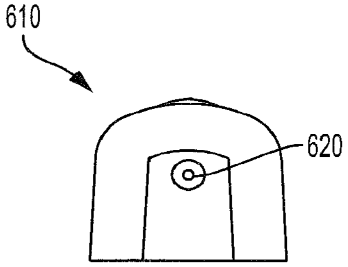

FIG. 6A shows a perspective view of an air pump controller 600, FIG. 6B shows a front view of the air pump controller 600, and FIG. 6C shows a bottom view of the air pump controller 600. The controller 600 includes a display window 602 and an indicator window 612 for battery light indicator. The display window 602 can be used to provide information to the user, such as an on/off button, a battery life indicator, a pressure reading, or any other status indications that may be helpful to the user. In this embodiment, the indicator window 612 is used to indicate whether the system is on or off. For example, a green light may indicate that the system is in use and a red light may indicate that the system is off. Internal components of the air pump controller 600 are protected by a casing, which includes a front portion 606, a bottom portion 610, and a back portion 608. A cover 604 is located at the top of the casing to provide access to and protect a USB port, which can be used to transmit and collect data. A charging port 620 is located at the bottom of the casing for plugging a charging cable into the air pump controller 600. The front portion 606, bottom portion 610, and back portion 608 may be connected with an adhesive (i.e., glue, tape) or by mechanical means (i.e., screws, bolts, pegs, form fitting).

Figure 7:
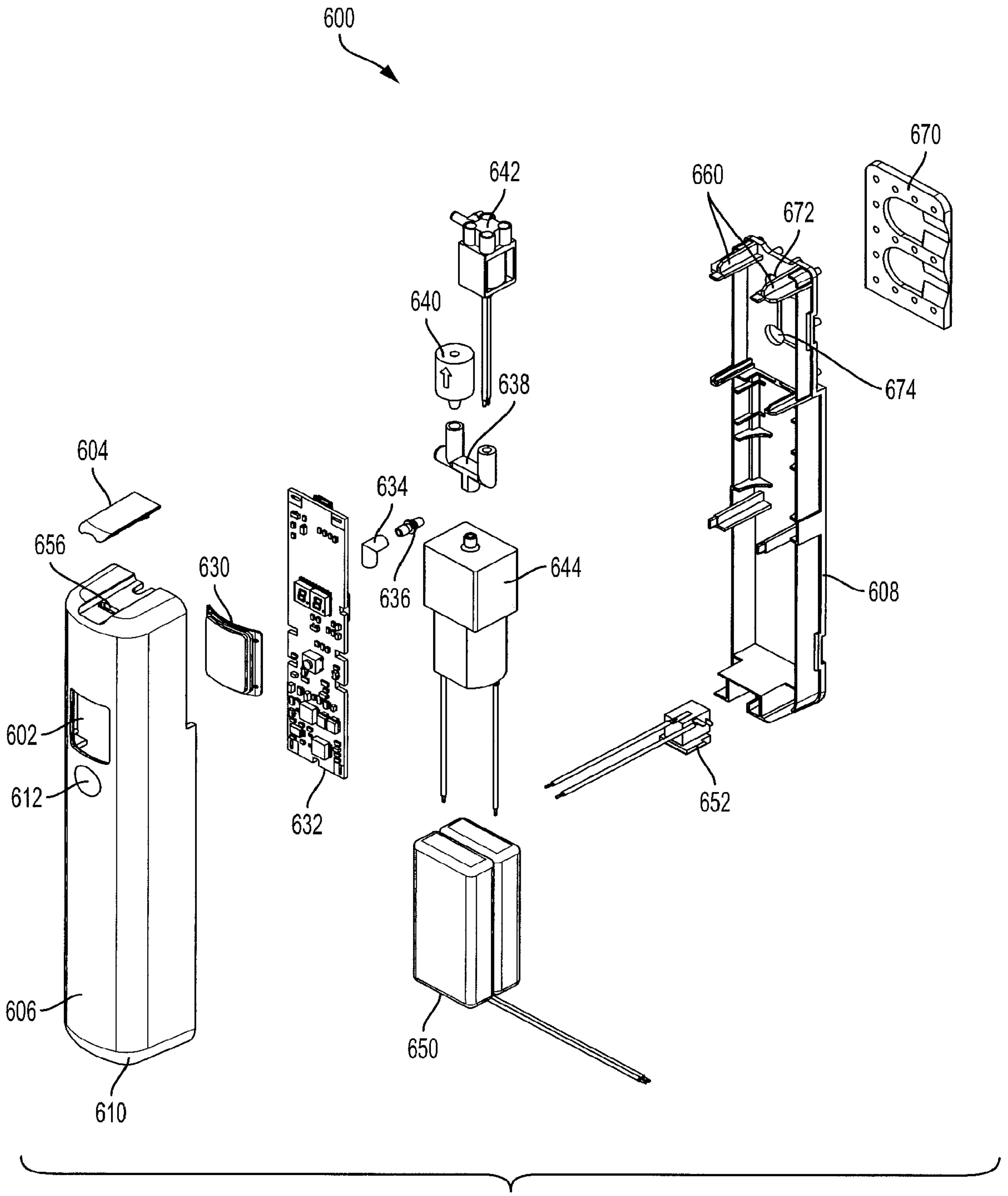
FIG. 7 shows an exploded view of the air pump controller of the portable intermittent compression system according to embodiments of the invention.

FIG. 7 illustrates an exploded view of an air pump controller 600. This view includes the casing, which includes a front portion 606, bottom portion 610, and back portion 608. These portions of the casing are designed to enclose the components of the air pump controller 600. In this embodiment, the front portion 606 and the back portion 608 are mechanically connected through pegs 660 located on the back portion 608 and corresponding apertures or holes on the front portion 606. The cover 604 provides access to and covers a USB port on the controller 600. The back portion 608 is further connected to a lock plate for the bladder 670. This plate 670, which is described in further detail below, enables attachment between the air pump controller 600 and the bladder portion of present invention. The display window 602 and indicator window 612 are also shown in FIG. 7. In some embodiments, the air pump controller 600 includes (1) a two-digit alpha-numeric display to show air pressure, (2) a DC power adapter, and (3) a deformable rubber cover over a USB connection.

The air pump controller 600 includes a circuit board 632 for controlling its operation. The circuit board 632 includes letter or number displays, indicator lights, and circuits for displaying information to the user and controlling an air pump 644. The circuit board 632 also includes a pressure switch and corresponding circuitry to measure the pressure of the bladder. A lens 630 connects between the display window 602 of the front portion 606 and the circuit board 632, such that the user can see the digital displays and indicator lights from the circuit board 632. The air pump controller 600 includes a battery 650, which supplies power to the circuit board 632, a solenoid valve 642, and the air pump 644. A DC jack 652 connects the charging port 620 to the battery 650 and converts AC current to DC current for power and charging the battery 650. Thus, the air pump controller 600 can run off the battery 650 or an external power supply that feeds the battery 650.

The air pump 644 is connected to an air pump manifold 638, which is designed to connect the pump 644 to a pressure relief valve 640 and a solenoid valve 642. The solenoid valve 642 transitions the air pump 644 between three states. In a first state, the air pump delivers air to the bladder (not shown in FIG. 7), in a second state the solenoid valve 642 prevents air from entering the bladder, and in a third state, the solenoid valve 642 controls the release of air from the bladder. The pressure relief valve 640 is used as a safety valve. If the pressure in the bladder gets too high, then the pressure relief valve 640 kicks in to release that pressure. A small barbed connector, which is not shown in this figure, is used to connect the air pump 644 to the bladder through the solenoid valve 642 by means of a first bladder aperture 674. The solenoid valve 642 controls the air into and out of the bladder. A connector 636 and manifold IPS 634 are utilized to connect a pressure switch (not shown) on the circuit board 632 to a second bladder aperture 672. A small barbed connector, which is not shown in this figure, may be used for this connection between the manifold IPS 634 and the bladder. This pressure switch measures the pressure in the top portion of the bladder. If the IPS 634 and/or the pressure switch stop working, the pressure relief valve 640 will ensure that the pressure does not exceed an amount that would be uncomfortable to the user.

Because the bladder inflates from distal (foot) to proximal (knee), the bladder is filled from the bottom to the top. In this embodiment, the solenoid valve 642 may be connected to the bottom portion of the bladder through the first bladder aperture 674 and the manifold IPS 634 may be connected to the top portion of the bladder through the second bladder aperture 672. The air is supplied through the bottom of the bladder and sensed through the top of the bladder.

As will be discussed further below, the air pump controller 600 may be connected to the bladder by a goose neck feature, which enables the air pump controller 600 and bladder to be inserted into the wrap and maintain the wrap's tensile integrity. A lock plate 670 is used to connect the back portion 608 to the bladder (not shown). The lock plate 670 includes open sections for the first and second bladder apertures 672, 674 to connect with the bladder. The lock plate 670 and back portion 608 may include complementary mating pins for connection. In FIG. 7, the back portion 608 has protrusions and the lock plate 670 has complementary apertures. In other embodiments, an ultrasonic push fit method could be used to attach the air pump controller 600 to the bladder.

Figure 8:
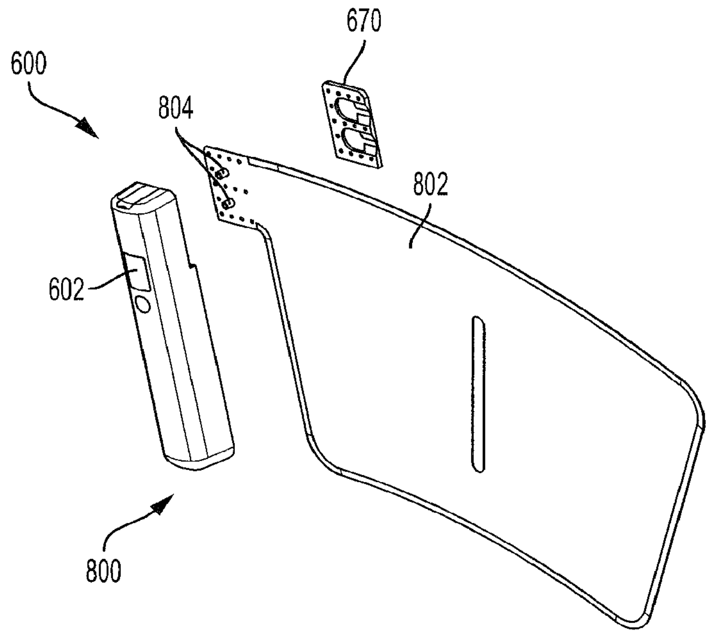
FIG. 8 shows a connection of the air pump controller and a bladder assembly of the portable intermittent compression system according to embodiments of the invention.

FIG. 8 shows a connection of the air pump controller 600 to a bladder assembly 802 to create an air pump controller 600 and bladder assembly 802 combination 800. The lock plate 670 is used to connect the air pump controller 600 and the bladder assembly 802. Specifically, protrusions (not shown) on the air pump controller 600 matably connect with the apertures on the lock plate 670. When connected, these protrusions are inserted through additional holes through the bladder assembly 802 to lock it between the air pump controller 600 and the lock plate 670. Tube fittings 804 are mounted on the bladder assembly 804 to provide an air connection between the air pump controller 600 and the bladder assembly 802. In some embodiments, one tube fitting (top) 804 is connected to the manifold IPS 634 in the air pump controller 600 and the other tube fitting (bottom) 804 is connected to the solenoid valve 642. Thus, the air pump controller 600 is mounted to the bladder assembly 802 through the lock plate 670. However, various other connection mechanisms (i.e., adhesives, fasteners, other mechanical connections) between the air pump controller 600 and the bladder assembly 802 are within the scope of the present invention.

Figure 9:
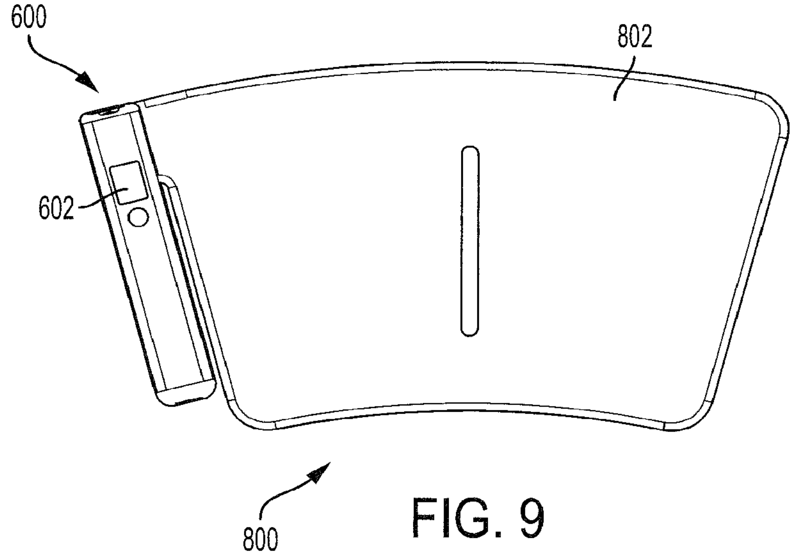
FIG. 9 shows a front view of the connection between the air pump controller and the bladder assembly of the portable intermittent compression system according to embodiments of the invention.
Figure 10:
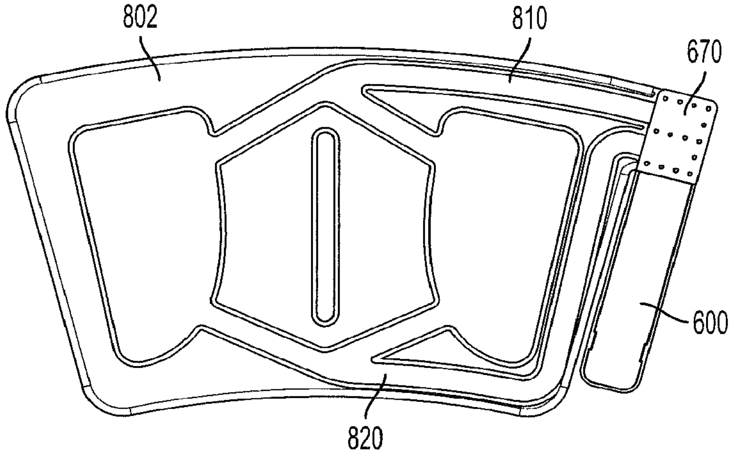
FIG. 10 shows a back view of the connection between the air pump controller and the bladder assembly of the portable intermittent compression system according to embodiments of the invention.

FIG. 9 shows a front view of the air pump controller 600 and bladder assembly 802 combination 800, and FIG. 10 shows a back view of the air pump controller 600 and bladder assembly 802 combination 800. When in use, FIG. 9 shows the side of the combination 800 that faces away from the user, while FIG. 10 shows the side of the combination 800 that faces toward the user. The display window 602 can be seen by the user through a wrap because it is facing away, while the inner bladder portions and the lock plate 670 face towards the user. The tube fittings 804 are not shown, but they provide an air connection between a top channel 810 of the bladder assembly 802 and the manifold IPS 634 and a bottom channel 820 of the bladder assembly 802 and the solenoid valve 642. These connections allow the air pump controller 600 to control the air in the bladder assembly 802 and read corresponding pressures within the bladder assembly 802.

Figure 11:
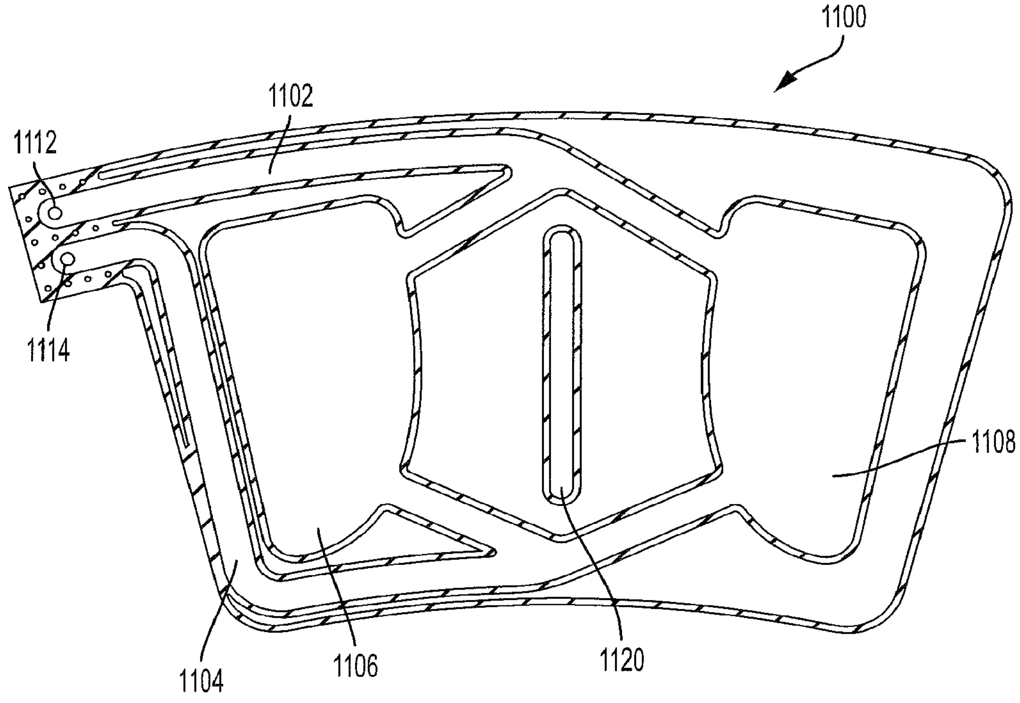
FIG. 11 shows a bladder assembly of the portable intermittent compression system according to embodiments of the invention.

FIG. 11 shows a bladder assembly 1100 of the present invention. An upper channel 1102 and a lower channel 1104 lead to a first bladder portion 1106 and a second bladder portion 1108. Because the bladder assembly 1100 inflates distal to proximal, air is provided to the first and second bladder portions 1106, 1108 through the lower channel 1104. Thus, an aperture or port 1114 within the lower channel 1104 indicates a connection to the air pump (not shown). The upper channel 1102 provides a connection to a pressure sensor (not shown) through an aperture or port 1112. This pressure sensor connects to the most distant or remote portion from the lower channel 1104. This location of the upper channel 1102 ensures that the pressure sensor is sensing the pressure at the most remote or distant location from where the first and second bladder portions 1106, 1108 are being filled with air. This location ensures that a determined pressure is being achieved in the bladder assembly 1100. If pressure was instead measured close to the lower channel 1104, where air is entering, then the pressure at the top of bladder portions 1106, 1108 may be considerably lower than the measured pressure at the bottom of the bladder portions 1106, 1108, and insufficient to provide a therapeutic benefit. The bladder assembly 1100 includes a gap or strip 1120 that is designed to line up with the center of the user's calf muscle. This strip 1120 and surrounding area between the first and second bladder portions 1106, 1108 provides flexibility around the user's calf muscle. The first and second bladder portions 1106, 1108 therefore inflate to provide compression or pressure around the user's calf, such that the inflation is not directly on top of the calf muscle.

In some embodiments, the first and second bladder portions 1106, 1108, and the upper and lower channels 1102, 1104, contain nano webbing, mesh, or reticulated foam These features ensure that the outer layers of the bladder assembly 1100 do not collapse or touch, which could make it difficult for the air pump controller (not shown) to expand the channels and cavities. By inserting a material such as nano webbing in these channels and cavities, the air is free to flow into the bladder assembly and inflate the first and second bladder portions 1106, 1108. This feature also prevents kinking within the bladder assembly 1100. Stitching, adhesives, or other fastening methods may be used to create the cavities or pockets within the upper and lower channels 1102, 1104 and the first and second bladder portions 1106, 1108.

The design, shape, and manner of compression for the bladder assembly 1100, create a novel sequential compression system that provides numerous advantages over traditional devices. The location of first and second bladder portions 1106, 1108 surround the user's calf when in operation and fill simultaneously from the bottom channel 1104. This allows the present invention to begin the compression at the bottom and on the outside of the user's calf and push towards the top of the user's calf, which pushes the blood from the foot area up towards the heart. This motion also pulls the calf together laterally through sequential and gradient compression. This manner of compression mimics ambulation and assists with circulation in the lymphatic system, veins, and arteries. This type of compression is not posterior focused like prior methods, but has a horizontal compression feature.

Many traditional DVT devices include multiple bladder portions that are vertically layered from distal (foot) to proximal (knee) and are sequentially inflated to provide distal to proximal compression. In the present invention, the bladder portions are separated horizontally to surround the calf. Distal to proximal compression is still provided because the bladder portions are filled from the bottom This configuration provides a horizontal compression on the user's calf in addition to the distal to proximal (vertical) compression, which has been shown to offer benefits to the user.

Figure 12:
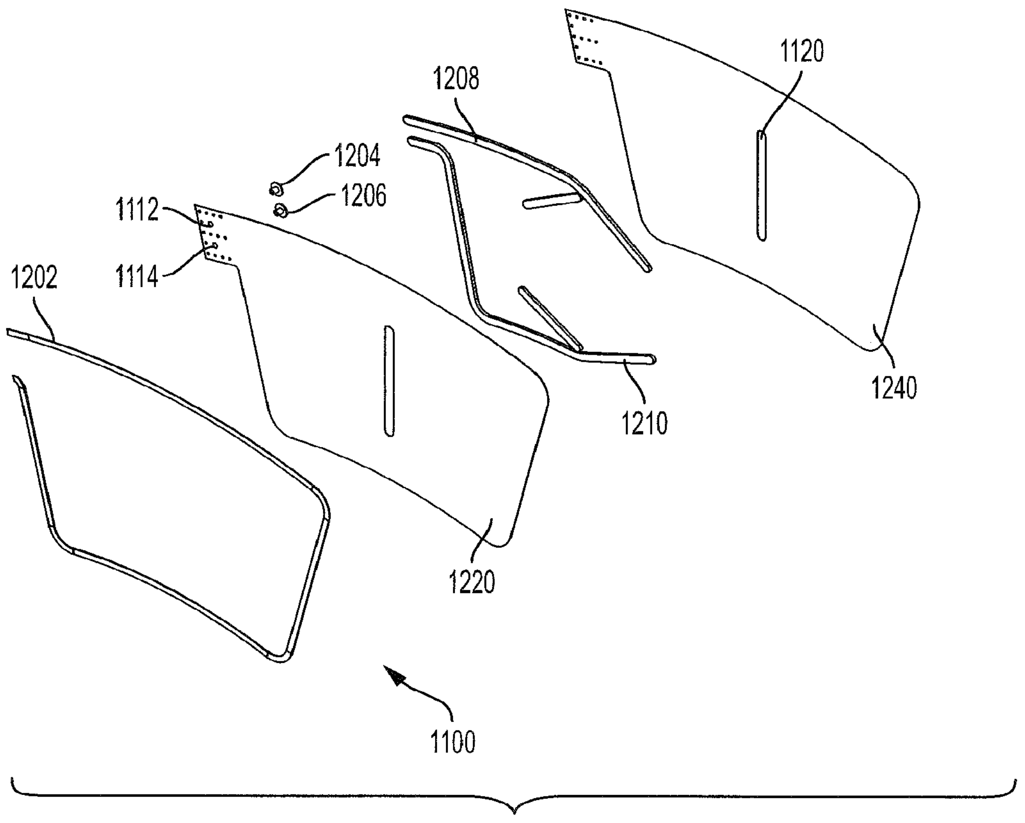
FIG. 12 shows an exploded view of the bladder assembly of the portable intermittent compression system according to embodiments of the invention.

FIG. 12 shows an exploded view of the bladder assembly 1100 of the present invention. An inner membrane, sleeve, or sheet 1240 connects to an outer membrane, sleeve, or sheet 1220 to create the bladder assembly 1100. Stitching, adhesives, or other fastening methods may be used to connect these membranes 1240, 1220. As mentioned above, similar stitching, adhesives, or other fastening methods may be used to create the channels, cavities, and/or pockets between the membranes 1240, 1220. An upper channel mesh 1208 fits within the upper channel 1102 (not shown in FIG. 12) to prevent collapse of the channel and improve air circulation within the bladder assembly 1100. A lower channel mesh 1210 fits within the lower channel 1104 (not shown in FIG. 12) to prevent collapse of the channel and improve air circulation within the bladder assembly 1100. Tube fittings 1204, 1206 are inserted between the inner 1240 and outer membranes 1220 to enable air to flow into or from the upper and lower channels 1102, 1104 (not shown). Apertures 1112, 1114 are provided in the outer membrane 1220, but not the inner membrane 1240, such that the tube fittings 1204, 1206 terminate between the two membranes. In some embodiments, tube fitting 1204 is connected to the manifold IPS 634 in the air pump controller 600 and tube fitting 1206 is connected to the solenoid valve 642 (shown in FIG. 7). In some embodiments, bias tape 1202 may be used on the outside edges of the bladder assembly 1100 to assist with holding the inner 1220 and outer membranes 1240 together and to provide a smooth edge connection between the membranes. For example, when the membranes 1220, 1240 are stitched or adhered together, there may be snags or rough edges that could get caught up during insertion of the bladder assembly 1100 into the wrap. The bias tape 1202 helps to smooth out these snags or rough edges.

The outer membrane 1220 may be made of a flexible material (i.e., thermoplastic polyurethane (TPU)) calendared or attached to a strong woven nylon sheet. This nylon sheet may provide strength and resistance to deformation during the inflation cycle. This strength and resistance to deformation encourages the inner membrane 1240, which is also made of a flexible material (i.e., TPU), to deform first and act upon the calf muscle more readily. Due to this difference in material, the membrane adjacent to the user's leg is faster to deform and supply compression to the user.

Figure 13A:
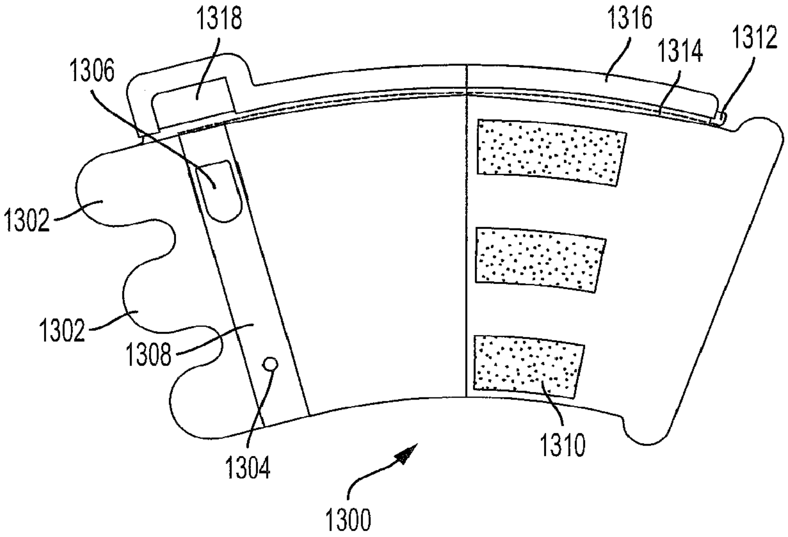
FIGS. 13A and 13B show alternative views of a wrap of the portable intermittent compression system.
Figure 13B:
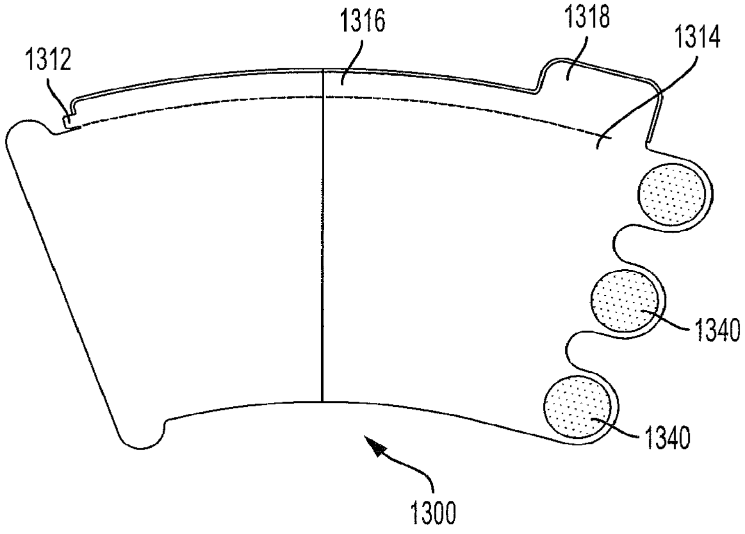

FIGS. 13A and 13B show alternative views of a wrap 1300 according to embodiments of the present invention. FIG. 13A shows a front view of the wrap 1300, and FIG. 13B shows a back view of the wrap 1300. When in use, FIG. 13A shows the side of the wrap 1300 that faces away from the user, while FIG. 13B shows the side of the 1300 that faces toward the user. In FIG. 13A, three tabs or extensions 1302 extend from the left edge of the wrap 1300. As shown in FIG. 13B, three hook fastener discs 1340 are located on the opposite side of those three tabs or extensions 1302. These hook fastener discs 1340 are designed to connect with three loop fasteners 1310 when wrapped around the user's leg. These discs 1340 provide tensile resistance across the height of the wrap 1300. The three loop fasteners 1310 are attached to the outside panel of the wrap in such locations and sizes to accommodate a variety of calf sizes. An extended pocket cover 1308 holds the air pump controller (not shown) and includes a display window 1306 and aperture or hole 1304 for access to the charging port of the air pump controller.

A perforation line 1314 is shown in FIGS. 13A and 13B, which indicates the top edge of the pocket for the air pump controller and bladder assembly (not shown). A strip 1316 that can be folded over by the user enables the user to close the pocket over the air pump controller and bladder assembly. The strip 1316 may include an adhesive (with or without a paper cover) or a hook and fastener system for closing the pocket. An additional tab or extension 1318 extends from the strip 1316 for enclosing the air pump controller within the extended pocket cover 1308. This tab 1318 may include the same adhesive or hook and fastener system for sealing in the air pump controller. The back side of the tab 1318 and the strip 1316 are shown in FIG. 13B. The user would fold over the tab 1318 and the strip 1316 to enclose the air pump controller and bladder assembly. A pull tab 1312 that connects to the perforation line 1314 is used to tear off the tab 1318 and strip 1316 after use. Specifically, the user may grab or pull the pull tab 1312 and pull across the wrap 1300 to open the pocket after use. This way the air pump controller and bladder assembly can be easily accessed and removed for future use with another wrap. The adhesive used with the tab 1318 and strip 1316 may be protected by a peel off liner tape.

Figure 14:
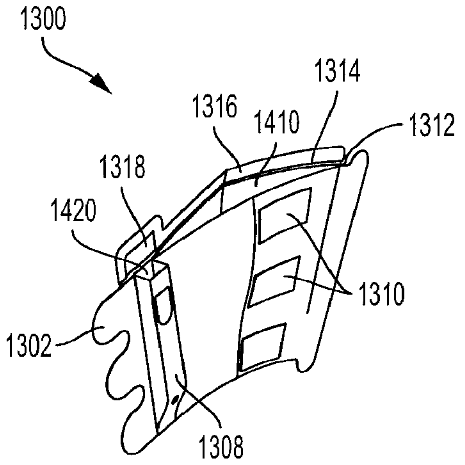
FIG. 14 shows a perspective view of the wrap of the portable intermittent compression system.

FIG. 14 shows a perspective view of the wrap 1300 according to embodiments of the present invention. This figure is similar to FIG. 13A, but illustrates how the wrap 1300 opens up to reveal a bladder pocket 1410 and an air pump controller pocket 1420. The air pump controller and bladder combination (not shown) fit into these pockets 1410, 1420 during operation. The extended pocket cover 1308 provides additional space for the air pump controller. After inserting the air pump controller and bladder combination into the pockets 1410, 1420, the user can fold over the strip 1316 and tab 1318 using the adhesive or hook and fastener system to enclose it. The perforation line 1314 signifies where the strip 1316 and tab 1318 would be folded over. When the user wants to remove the air pump controller and bladder combination, he or she can pull the pull tab 1312 across the perforation line 1314 to rip off the strip 1316 and tab 1318. This enables the user to access the air pump controller and bladder combination, so that it can be removed and used with another wrap. At this point, the wrap can be discarded, but the air pump controller and bladder combination can be used again. As shown in FIG. 14, the wrap 1300 may comprise two sheets or membranes that are connected or attached on three sides (left, bottom, and right). The fourth side (top) is not connected or attached, so that the two sheets or membranes can be separated to create a pocket for the air pump controller and bladder combination (not shown).

Figure 15:
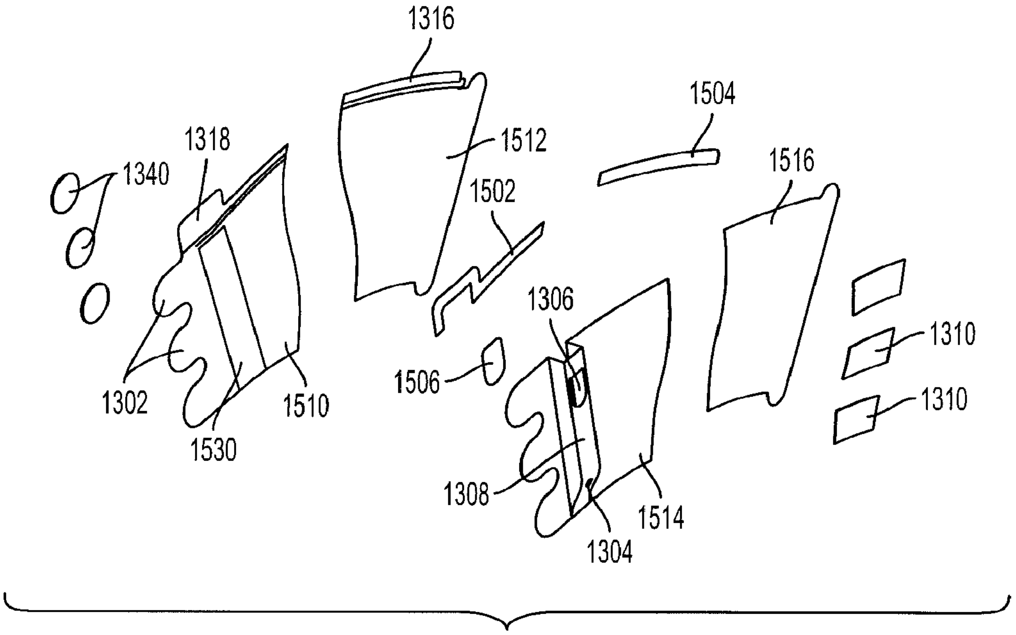
FIG. 15 shows an exploded view of the wrap of the portable intermittent compression system.

FIG. 15 shows an exploded view of the wrap 1300 according to embodiments of the present invention. Most of the reference numerals in FIG. 15 were described with respect to FIGS. 13A, 13B, and 14, but the exploded view highlights a few additional features of the wrap 1300. This view illustrates that the pockets of the wrap are created by four separate panels. Wrap panel 1 1514 and wrap panel 2 1516 are connected by adhesive, stitching, or other means to create a front layer of wrap 1300, while wrap panel 3 1510 and wrap panel 4 1512 are connected to create a back layer of the wrap 1300. When the front layer and back layer are connected by adhesive, stitching, or other means at a left edge, a bottom edge, and a right edge, the bladder pocket 1410 and the air pump controller pocket 1420 are formed. A first wrap tape 1502 fits over the tab 1318 and first portion of the strip 1316 of wrap panel 3 1510 and a second wrap tape 1504 fits over a second portion of the strip 1316 of wrap panel 4 1512. Other connection means for wrap tapes 1502, 1504 (i.e., hook and fastener, mechanical fitting) are within the scope of this invention. A wrap panel window 1506 is also shown. This provides protection for the air pump controller (not shown), while allowing a user to see the display panel. In combination, the extended pocket cover 1308 and the wrap panel window 1506 keep the air pump controller clean and sanitary for future use.

As shown in FIGS. 14 and 15, the air pump controller pocket 1420 extends beyond the bladder pocket 1410 to allow room for the air pump controller. In some embodiments, wrap panel 3 1510 and/or wrap panel 4 1512 may include one or more elastic or flexible sections to assist with placement on the user's leg and to prevent the wrap 1300 from falling off or slipping down the user's leg. For example, an elastic or flexible section may be included behind the air pump controller pocket 1420. In this embodiment, wrap panel 3 1510 may have an elastic region mated to wrap panel 1 1514, which holds the air pump controller. With this placement, the elastic or flexible section would also assist with keeping the air pump controller in place and allowing the user to easily slide the air pump controller into the external pocket 1420. This elastic region has a fixed amount of expansion, which allows the wrap 1300 to be tightly donned on the leg. The extended pocket cover 1308 further assists with holding the pump in place. This extended pocket cover 1308 may be formed from a single sheet by folding and attaching the material to wrap panel 1 1514. An elastic band or strip may also be included at the bottom of the wrap 1300 to prevent the wrap from falling off or slipping down the leg.

In some embodiments, the wrap panels 1510, 1512, 1514, 1516 comprise two flat fabric sheets with "S" shaped curves, such that when they are joined together they create a 3-dimensional shape which mimics the shape of the calf. This feature helps keep the wrap 1300 in the correct location on the calf and helps it to tightly wrap around the calf, which removes excess material that would have to be tightened in the inflation cycle. Without this excess material, the wrap 1300 of the present invention enjoys a shorter inflation cycle and a higher therapeutic benefit. The wrap 1300 may have an inner boundary, which provides for accurate placement of the wrap 1300 and this boundary is tapered so the bladder assembly (not shown) can be easily inserted.

In some embodiments, the wrap 1300 may include an elastic strip 1530 on wrap panel 3 1510, which may be located behind the extended pocket cover 1308. This elastic strip 1530 is designed to improve the flexibility of the inner wrap panels 1510, 1512, so that it can attach to and stay on the user's appendage during use. However, the elastic strip 1530 should have a limited width and height, so that it does not encompass a significant surface area of the wrap. If the elastic strip 1530 extended throughout the entire inner wrap panels 1510, 1512, then it may reduce the therapeutic effect of compression because it would stretch along with the expansion of the bladder. Placement of the elastic strip 1530 on the inner wrap panels 1510, 1512 assists with holding the wrap in place during movement by the user.

The remainder of the wrap 1300 may be made of a substantially non-elastic material, which allows for quicker inflation because it does not stretch or compress. In a preferred embodiment, the wrap panels 1510, 1512, 1514, 1516 and extended pocket cover 1308 are made of a material that is commonly used in hospital gowns, surgery aprons, and other equipment (i.e., polyvinyl chloride (PVC), polyethylene, and polypropylene). These materials are strong and hydrophobic to protect the air pump controller, bladder, and patient, and are widely accepted within the healthcare community.

The scope of the present invention covers various configurations for the portable, reusable, and disposable compression system For example, the wrap and the bladder assembly could be integrated, and an air pump controller could be mounted to the bladder wrap/bladder assembly combination. In this embodiment, the air pump controller may be reusable, while the wrap/bladder assembly combination could be disposed of after one or more uses. In some embodiments, the wrap/bladder assembly combination could be made of PVC, polyethylene, or polypropylene, so that it is comfortable to the user.

Figure 16:
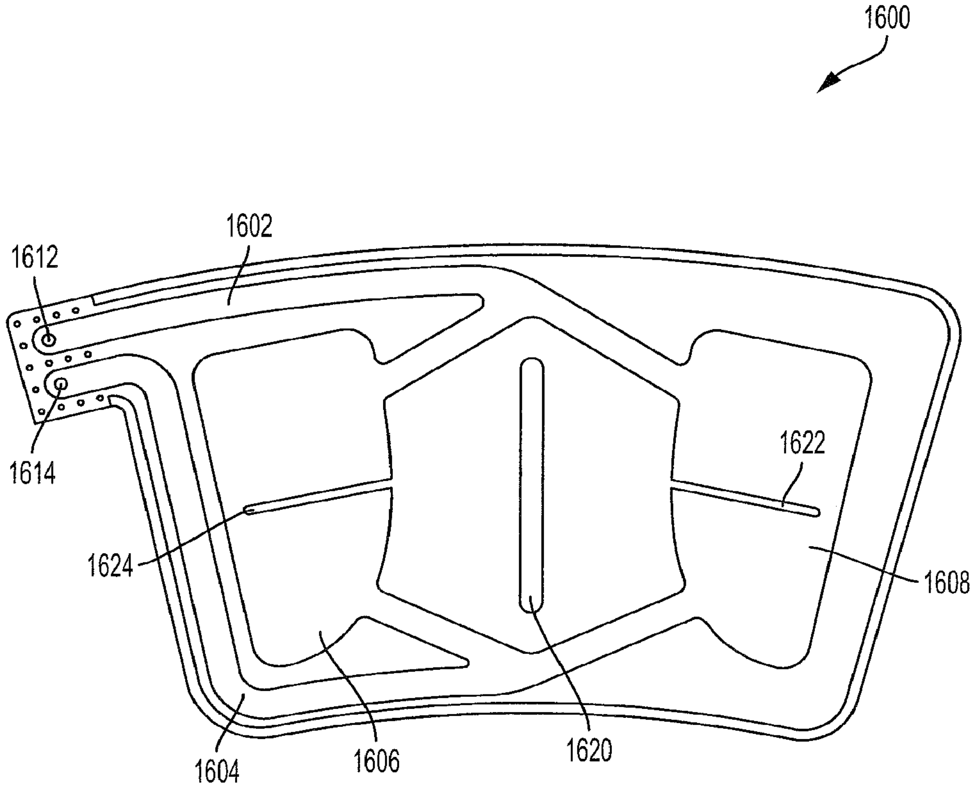
FIG. 16 shows a bladder assembly of the portable intermittent compression system according to embodiments of the invention.

FIG. 16 shows a bladder assembly 1600 of the present invention, which is similar to FIG. 11. An upper channel 1602 and a lower channel 1604 lead to a first bladder portion 1606 and a second bladder portion 1608. Because the bladder assembly 1600 inflates distal to proximal, air is provided to the first and second bladder portions 1606, 1608 through the lower channel 1604. Thus, an aperture or port 1614 within the lower channel 1604 indicates a connection to the air pump (not shown). The upper channel 1602 provides a connection to a pressure sensor (not shown) through an aperture or port 1612. This pressure sensor connects to the most distant or remote portion from the lower channel 1604. This location of the upper channel 1602 ensures that the pressure sensor is sensing the pressure at the most remote or distant location from where the first and second bladder portions 1606, 1608 are being filled with air. Further, the bladder portions 1606, 1608 may be separated to create numerous sections. For example, a first peninsula section 1624 may separate first bladder portion 1606 into an upper and lower portion, wherein the lower portion fills with air before the upper portion. Similarly, a second peninsula section 1622 may separate second bladder portion 1608 into an upper and lower portion. By segregating these sections and measuring the air pressure at remote sections of the bladder portions 1606, 1608, the system ensures that a determined pressure is being achieved in the bladder assembly 1600. If pressure was instead measured close to the lower channel 1604, where air is entering the lower portions, then the pressure at the upper portions may be considerably lower than the measured pressure at the lower portions, and insufficient to provide a therapeutic benefit. The bladder assembly 1600 includes a gap or strip 1620 that is designed to line up with the center of the user's calf muscle.

The first and second peninsula sections 1624, 1622 provide a narrow passageway between the lower and upper portions of the bladder portions 1606, 1608. This enables progressive inflation and deflation, with the lower portions inflating and deflating before the upper portions.

Figure 17:
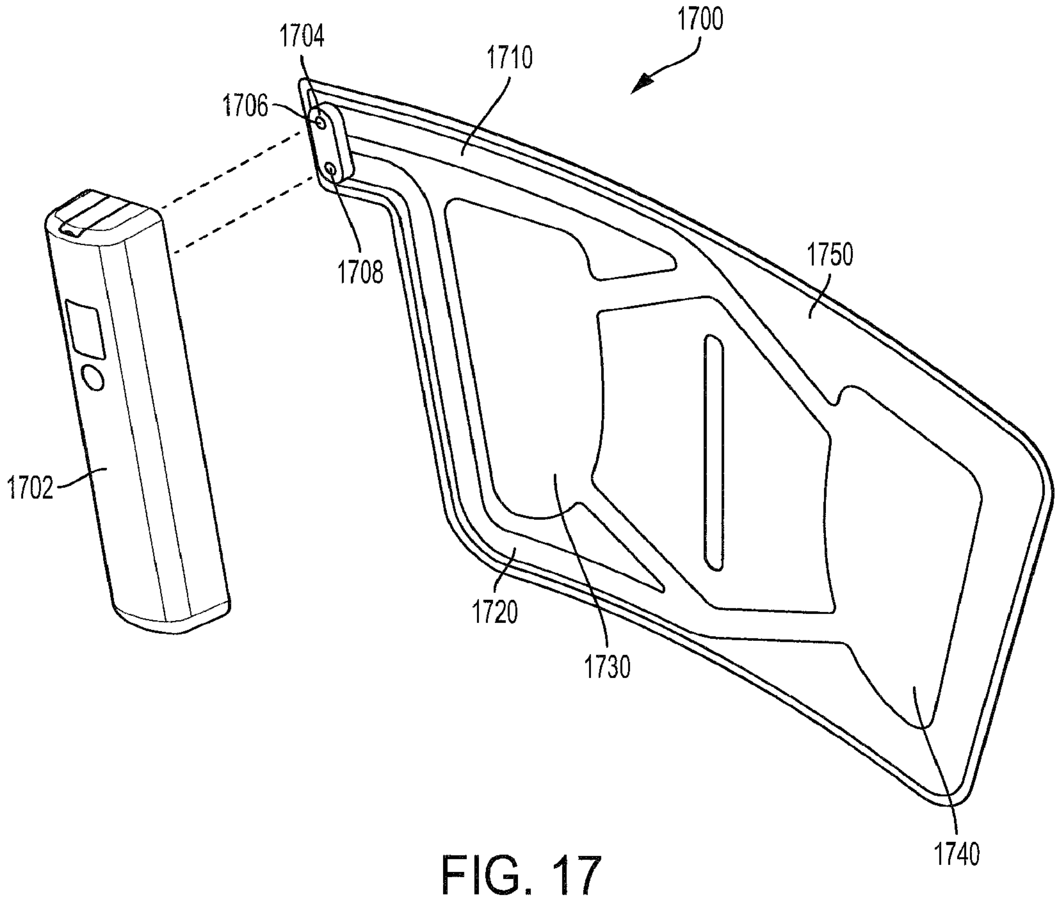
FIG. 17 shows an alternative portable intermittent compression system according to embodiments of the invention.

FIG. 17 shows a portable intermittent compression system with an integrated bladder assembly 1700, wherein the wrap and bladder assembly are integrated. In various embodiments, the material 1750 of the integrated bladder assembly 1700 may be made of PVC, polyethylene, or polypropylene, so that it is comfortable to the user. For this embodiment, the integrated bladder assembly 1700 could be disposable or for limited use, such that it would have to attach and detach from an air pump controller 1702. A connector 1704 may connect the air pump controller 1702 to the integrated bladder assembly 1700. As discussed above, aperture 1708 connects a lower channel 1720 to the air pump controller 1702, and aperture 1706 connects the upper channel 1710 to the air pump controller 1702. The integrated bladder assembly 1700 also has a first bladder portion 1730 and second bladder portion 1740. The advantage of this embodiment is that the air pump controller 1702 is reusable and can be reattached to numerous integrated bladder assemblies 1700. In a hospital environment, a single air pump controller 1702 could be assigned to a hospital room or a patient for repeated use with different integrated bladder assemblies 1700. Unlike prior embodiments, this integrated bladder could be disposable just like the wrap discussed above. FIG. 17 only illustrates one embodiment with respect to connector 1704 and many other embodiments are within the scope of this invention.

Figure 18:
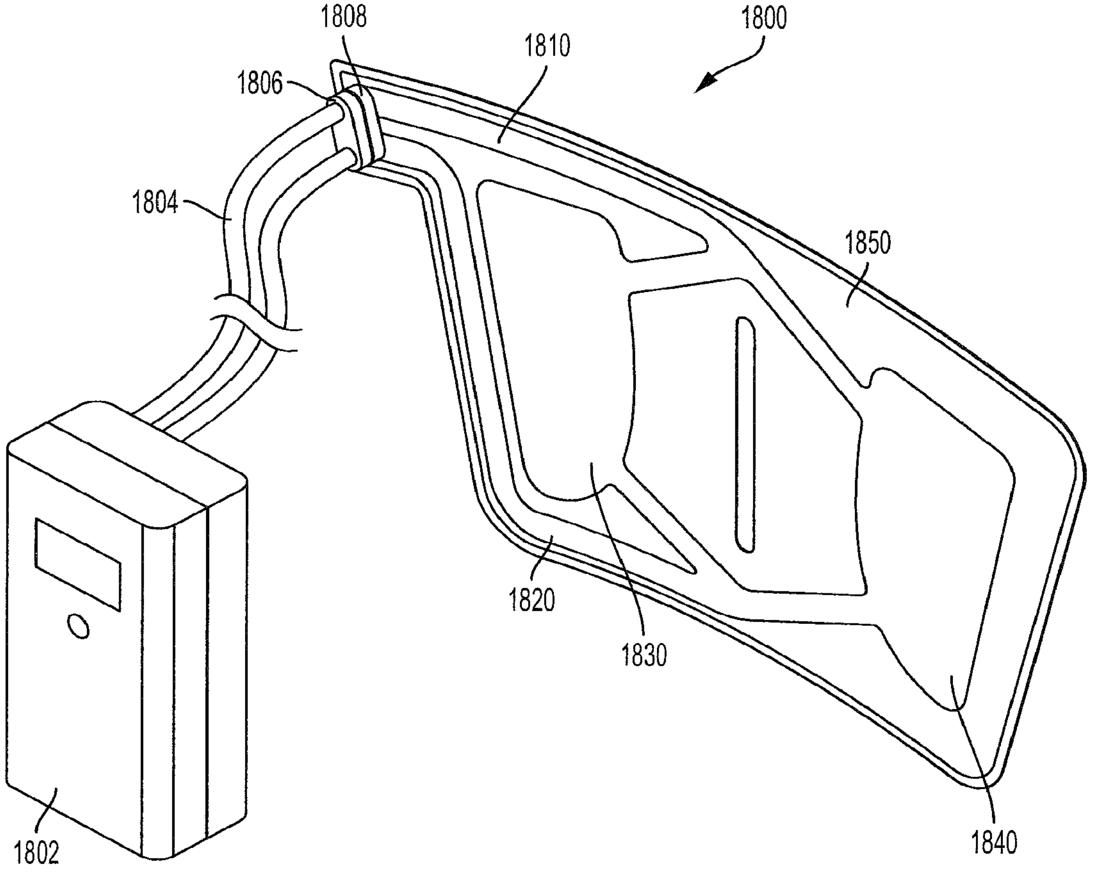
FIG. 18 shows an alternative portable intermittent compression system according to embodiments of the invention.

FIG. 18 shows a similar intermittent compression system, where an air pump controller 1802 connects to the integrated bladder assembly 1800 through tubing 1804. The material 1850 of the integrated bladder assembly 1800 may be made of PVC, polyethylene, or polypropylene, so that it is comfortable to the user. For this embodiment, the integrated bladder assembly 1800 could be disposable or for limited use, such that it would have to attach and detach from the tubing 1804. A first connector 1806 may connect the tubing 1804 to a second connector 1808, which is attached to the integrated bladder assembly 1800. The first connector 1806 and the second connector 1808 link the air pump controller 1802 to a lower channel 1820 and an upper channel 1810. The integrated bladder assembly 1800 also has a first bladder portion 1830 and second bladder portion 1840. The advantage of this embodiment is that the air pump controller 1802 is reusable and can be reattached to numerous integrated bladder assemblies 1800. In a hospital environment, a single air pump controller 1802 could be assigned to a hospital room or a patient for repeated use with different integrated bladder assemblies 1800.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bladder for use with a compression system, said bladder comprising:

a first container and a second container for storing air, wherein said bladder is configured to fit inside a cavity of a wrap and wherein said first container is adjacent to a first vertical side of said bladder and said second container is adjacent to a second vertical side of said bladder when inside said cavity of said wrap;

at least one input channel for supplying air to said first container and said second container; and at least one output channel for removing air from said first container and said second container;

a central slot that extends vertically between the first container and the second container and is configured to align with a center of a calf of a user;

wherein said bladder is configured to be coupled to a pump and said input channel is configured to supply air to said first container through an inferior portion of said first container and simultaneously to said second container through an inferior portion of said second container; and wherein the first container and the second container are spaced from the central slot such that inflation of the first container and the second container is not directly on top of a muscle of a calf when the first container and the second container are disposed on opposing sides of the calf of the user.

2. The bladder of claim 1 wherein said first container and said second container are configured to provide compression to opposite sides of a user's appendage.

3. The bladder of claim 1 wherein said at least one output channel is configured to remove air through connection to a superior portion of said first container and simultaneously remove air through connection a superior portion of said second container.

4. The bladder of claim 1 wherein said input channel is further configured to remove air from said first container and said second container when said air is not being supplied to said first container and said second container.

5. The bladder of claim 1, further comprising a first peninsula section for dividing said first container into a first portion and a second portion and a second peninsula section for dividing said second container into a third portion and a fourth portion.

6. The bladder of claim 5 wherein said input channel is coupled to said first portion of said first container and to said third portion of said second container.

7. The bladder of claim 1 further comprising a first port for coupling said input channel of said bladder to said pump.

* * * * *